(12) United States Patent
Mizuno et al.

(10) Patent No.: US 7,646,190 B2
(45) Date of Patent: Jan. 12, 2010

(54) STRESS MEASUREMENT DEVICE AND STRESS MEASUREMENT METHOD

(75) Inventors: Kentaro Mizuno, Nisshin (JP); Shoji Hashimoto, Seto (JP); Hidenori Moriya, Susono (JP); Hiromichi Yasuda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 131 days.

(21) Appl. No.: 11/727,152

(22) Filed: Mar. 23, 2007

(65) Prior Publication Data

US 2007/0240518 A1   Oct. 18, 2007

(30) Foreign Application Priority Data

Mar. 28, 2006   (JP) .............................. 2006-087646

(51) Int. Cl.
*G01N 19/00*   (2006.01)
(52) U.S. Cl. ...................... 324/71.1; 324/727; 324/722; 324/71.5
(58) Field of Classification Search ................ 324/71.1, 324/71.5, 727
See application file for complete search history.

(56) References Cited

U.S. PATENT DOCUMENTS

| | | | | |
|---|---|---|---|---|
| 3,430,130 A | * | 2/1969 | Schneider | 324/442 |
| 3,626,348 A | * | 12/1971 | Alten | 338/20 |
| 4,000,643 A | * | 1/1977 | Pearson | 73/708 |
| 4,532,468 A | * | 7/1985 | Nishida et al. | 323/367 |
| 4,667,516 A | * | 5/1987 | Schulz | 73/708 |
| 5,796,291 A | * | 8/1998 | Mattes et al. | 327/513 |
| 6,323,629 B1 | * | 11/2001 | Scruggs et al. | 323/312 |
| 2003/0025488 A1 | * | 2/2003 | Mazzochette et al. | 324/95 |
| 2005/0162160 A1 | * | 7/2005 | Ausserlechner et al. | 324/251 |

FOREIGN PATENT DOCUMENTS

JP   A 08-181331   7/1996

OTHER PUBLICATIONS

Wilson, Jerry, Technical College Physics, CBC & Saunders College Publishing, 1982, p. 418-420.*

* cited by examiner

*Primary Examiner*—Thomas Valone
(74) *Attorney, Agent, or Firm*—Oliff & Berridge, PLC

(57) ABSTRACT

A stress measurement device includes a current supply portion; a series circuit which is connected to the current supply portion and has a piezoresistive element that forms a single gauge resistance and a compensating diode that is connected in series to the piezoresistive element; and a voltage measuring portion that measures voltage between both ends of the series circuit. The single gauge resistance has a piezoresistive effect in which a resistance value changes according to applied stress, and a positive temperature characteristic in which the resistance value increases depending on an increase in temperature. The compensating diode is provided in a forward direction with respect to the current supply portion and has a negative temperature characteristic in which a voltage between an anode and a cathode of the compensating diode decreases depending on the increase in temperature.

6 Claims, 10 Drawing Sheets

STRESS MEASUREMENT DEVICE AND STRESS MEASUREMENT METHOD

INCORPORATION BY REFERENCE

The disclosure of Japanese Patent Application No. 2006-087646 filed on Mar. 28, 2006, including the specification, drawings and abstract is incorporated herein by reference in its entirety.

BACKGROUND OF THE INVENTION

1. Field of the Invention

The invention relates to a stress measurement device and a stress measurement method using a piezoresistive element.

2. Description of the Related Art

A resistance value of a piezoresistive element having a piezoresistive effect changes according to a change in the applied stress. Stress measurement devices have been developed which convert the stress applied to a piezoresistive element into a voltage value using this phenomenon. These stress measurement devices sometimes measure, for example hydraulic pressure in various engines or atmospheric pressure. For example, Japanese Patent Application Publication No. JP-A-8-181331 describes a stress measurement device in which a piezoresistive element is used to form a bridge circuit. In this stress measurement device, a constant voltage supply is used as means for supplying power to the bridge circuit.

When a piezoresistive element is used as a gauge resistance, the piezoresistive element has a positive temperature coefficient with respect to the ambient temperature. That is, the resistance value of the gauge resistance increases according to an increase in ambient temperature. When the piezoresistive element is used in a stress measurement device, a reference voltage increases according to an increase in the resistance value that depends on the ambient temperature. In order to measure the stress by measuring the voltage of the piezoresistive element, it is necessary to compensate for this increase in reference voltage due to the ambient temperature.

As described in JP-A-8-181331, when a piezoresistive element is used to form the bridge circuit, the change in the resistance value is cancelled out by the resistances that form the bridge circuit. Therefore, the output voltage does not easily change according to the ambient temperature. However, with a piezoresistive element in a bridge circuit, at least four terminals and four wires are necessary, which makes it difficult to make the element small. Consequently, when a bridge-type piezoresistive element is used in a stress measurement device, the terminal and circuit configurations of the device become quite complex. When a single gauge-type piezoresistive element that can be formed with two terminals is used, only two terminals and a uniaxial wireare necessary, so a simple circuit can be realized. Using a single gauge-type piezoresistive element that can be formed with two terminals easily enables the device to be small. On the other hand, the single gauge-type piezoresistive element has only single gauge resistance so a change in the resistance value due to the ambient temperature will not be cancelled out in the piezoresistive element. In order to employ a single gauge-type piezoresistive element in a stress measurement device with a wide range of temperatures, it is necessary to compensate for the change in output voltage due to the ambient temperature.

SUMMARY OF THE INVENTION

This invention thus provides a stress measurement device and method using a piezoresistive element as a single gauge resistance, which are capable of compensating for the effect of ambient temperature.

This invention relates to a device and method for measuring stress. A first aspect of the invention relates to a stress measurement device that includes a current supply portion; a series circuit which is connected to the current supply portion and has a piezoresistive element that forms a single gauge resistance and a compensating diode that is connected in series to the piezoresistive element; and a voltage measuring portion that measures voltage between both ends of the series circuit. Also, a second aspect of the invention relates to a stress measurement method that includes supplying current to a series circuit that has a piezoresistive element that forms a single gauge resistance and a compensating diode that is connected in series to the piezoresistive element, measuring voltage between both ends of the series circuit, and converting a value of the measured voltage into a stress value. The single gauge resistance has a piezoresistive effect in which a resistance value changes according to applied stress, and a positive temperature characteristic in which the resistance value increases depending on an increase in ambient temperature. The compensating diode is provided in a forward direction with respect to a current supply portion and has a negative temperature characteristic in which a voltage between an anode and a cathode of the compensating diode decreases depending on the increase in the ambient temperature.

Figure 15:
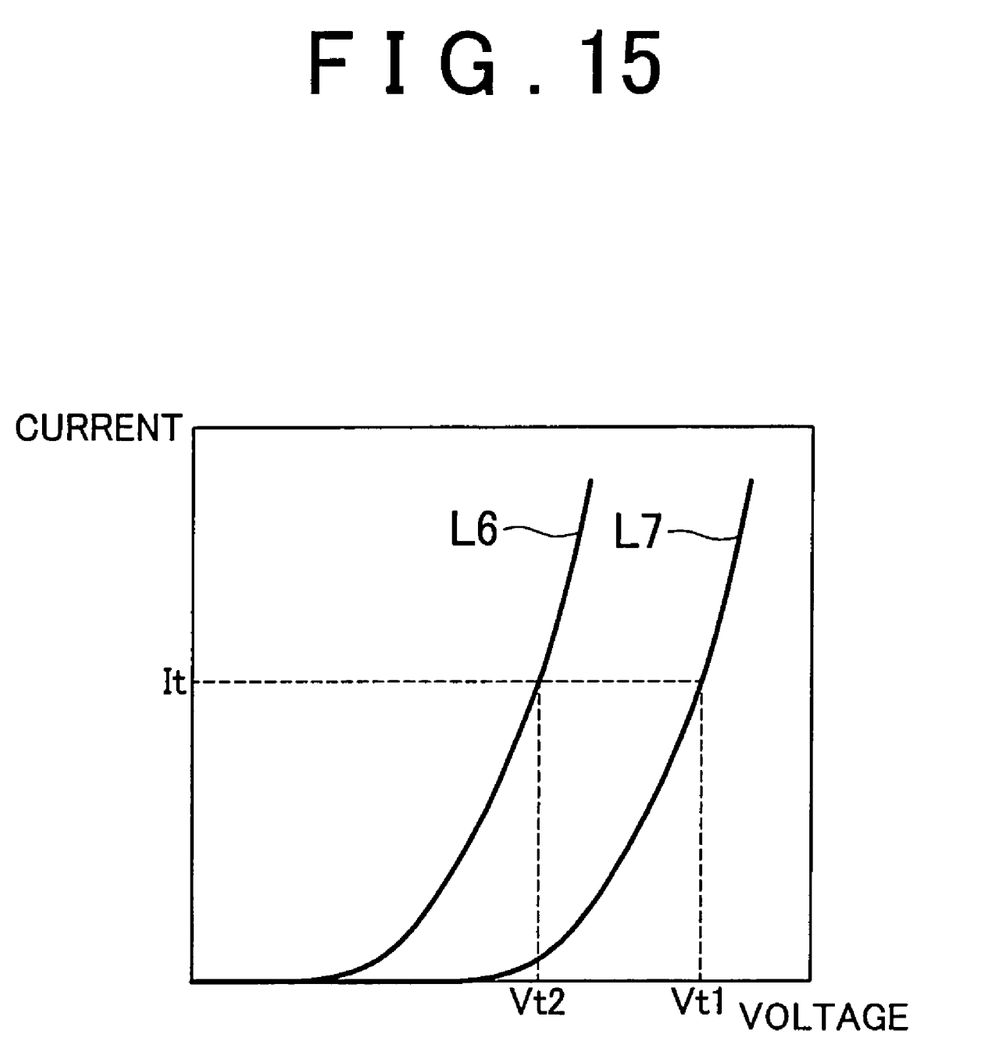
FIG. 15 is a graph showing a change in voltage with respect to the temperature of a diode.

The single gauge resistance has a positive temperature characteristic in which the resistance value increases depending on an increase in the ambient temperature. When constant current is supplied, the voltage of the piezoresistive element increases according to an increase in the ambient temperature. The voltage of the diode has a negative temperature characteristic in which the voltage between an anode and a cathode of the compensating diode decreases according to an increase in the ambient temperature. FIG. 15 is a graph showing the relationship between the current and the voltage between the anode and cathode of the diode. In the graph in FIG. 15, L6 represents the change when the ambient temperature is high and L7 represents the change when the temperature is low. As shown in the graph in FIG. 15, when a predetermined current It flows through the diode, the voltage between the anode and cathode decreases as the ambient temperature increases. According to the device, the portion of the voltage converted from the resistance value of the single gauge resistance that depends on the ambient temperature can be compensated for by a change in the voltage of the diode. As a result, it is possible to compensate for a change in the reference voltage due to the temperature.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
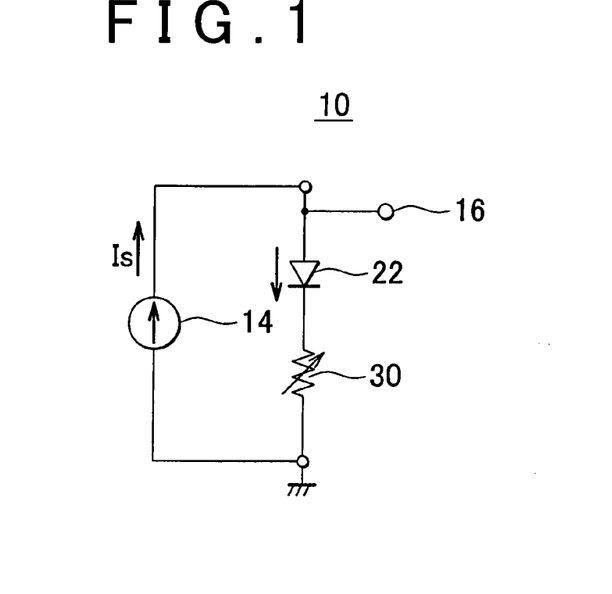
FIG. 1 is a circuit diagram showing a frame format of a stress measurement device according to a first example embodiment of the invention.

FIG. 1 is a block diagram of a stress measurement device 10 according to a first example embodiment of the invention. This stress measurement device 10 is used to measure temperature and hydraulic pressure of a fuel pump of a vehicle or the like. The ambient temperature where the stress measurement device 10 is arranged ranges from low in the winter to normal (e.g., −40° C. to 40° C.) and may become high (e.g., 150° C.) when the fuel pump is operating. The stress measurement device 10 is expected to accurately measure the temperature and hydraulic pressure even when the ambient temperature changes over this broad range of temperatures.

The stress measurement device 10 includes a constant-current power supply 14, a piezoresistive element 30, a compensating diode 22 that is connected in series to the piezoresistive element 30, and a voltage measuring portion 16. The piezoresistive element 30 forms a single gauge resistance. As the piezoresistive element 30, a piezoresistive element 30 is used which is formed by introducing p-type impurities on a surface portion of a silicon chip that contains n-type impurities. A pressure-receiving block contacts this piezoresistive element 30. Hydraulic pressure is applied to the piezoresistive element 30 through this pressure-receiving block. The resistance value of the piezoresistive element 30 changes depending on the magnitude of the applied hydraulic pressure. The piezoresistive element 30 and the compensating diode 22 form a series circuit. The voltage measuring portion 16 measures the voltage in the series circuit. A terminal of the piezoresistive element 30 opposite the compensating diode 22 is grounded.

The resistance of the piezoresistive element 30 increases depending on an increase in temperature. Therefore, when constant current is supplied, a reference voltage output from the piezoresistive element 30 changes depending on the change in the temperature. Here the term "reference voltage" refers to voltage that is measured by the voltage measuring portion 16 when stress (i.e., hydraulic pressure) is not being applied to the piezoresistive element 30. This stress measurement device 10 employs the compensating diode 22 to cancel out this change. The voltage between the anode and the cathode of the diode drops depending on an increase in the ambient temperature. Using this voltage drop phenomenon of the compensating diode 22, it is possible to cancel out the increase in the reference voltage that depends on an increase in the ambient temperature.

Figure 2:
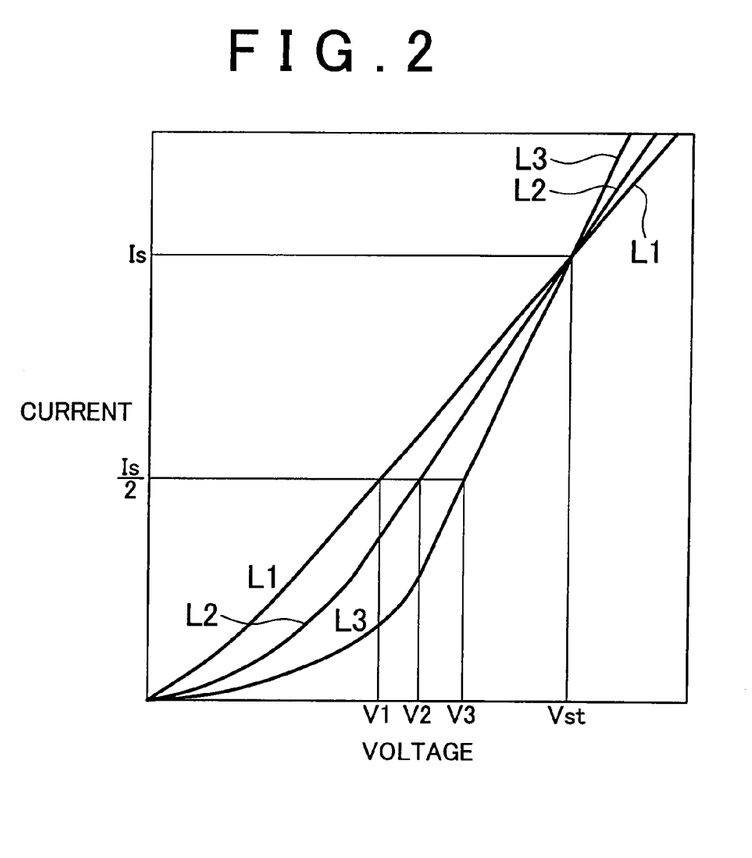
FIG. 2 is a graph showing the relationship between input current and output voltage during low temperature, normal temperature, and high temperature.

FIG. 2 is a graph showing the relationship between current supplied by the constant-current power supply 14 to the series circuit of the piezoresistive element 30 and the compensating diode 22, and the output voltage when hydraulic pressure is not being applied. In the graph in FIG. 2, L1 represents a change in the high temperature (e.g., 100° C.), L2 represents a change in the normal temperature (e.g., 25° C.), and L3 represents a change in the low temperature (e.g., −20° C.). When the current supplied to the piezoresistive element 30 is $I_s$, the stress measurement device 10 outputs a voltage $V_{st}$ regardless of the ambient temperature. The current $I_s$ is set such that a value which is the product calculated by multiplying the resistance at normal temperature of the piezoresistive element 30, a resistance temperature coefficient of the piezoresistive element 30, and that current, becomes equal to a rate of change in the voltage between the anode and cathode which depends on the temperature of the compensating diode 22. Therefore, when the current value of the supply current is set to $I_s$, an increase in the hydraulic pressure can be accurately measured because the reference voltage of the stress measurement device 10 without applied hydraulic pressure stabilizes.

Figure 3:
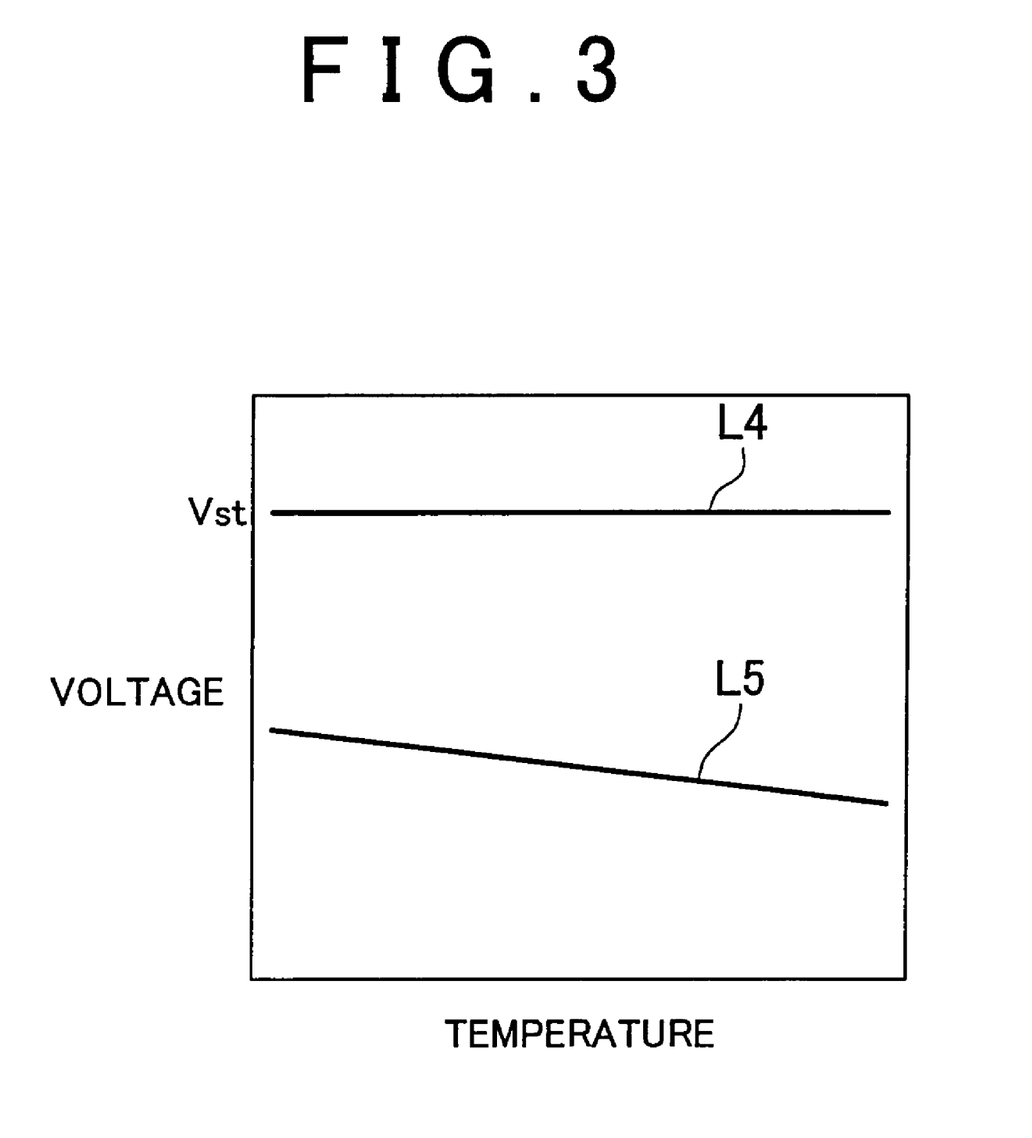
FIG. 3 is a graph showing changes in voltage with respect to temperature when measuring stress and when measuring temperature.

If another current value, being different from the $I_s$, is set as the supplied current, the reference voltage changes depending on the ambient temperature. That is, if the current value of the input current is set lower than $I_s$, the reference voltage becomes lower as the ambient temperature increases. On the other hand, if the current value of the input current is set higher than $I_s$, the reference voltage increases as the ambient temperature increases. For example, as shown in the graph in FIG. 2, if the current supplied by the constant-current power supply 14 is set at $I_s/2$, the output voltage drops from V3 to V2 to V1 as the ambient temperature increases from low to normal to high. The graph in FIG. 3 shows this phenomenon. FIG. 3 is a graph that shows the change in the reference voltage (i.e., the voltage when no hydraulic pressure is being applied) with respect to ambient temperature. L4 represents the change when the input current is $I_s$, and L5 represents the change when the input current is $I_s/2$. As shown by L4, when the input current is $I_s$, the reference voltage is maintained at a constant voltage value $V_{st}$. On the other hand, when the input current is $I_s/2$, as shown by L5, the reference voltage drops linearly as the ambient temperature increases. The stress measurement device 10 is able to easily measure the ambient temperature using this phenomenon.

Figure 4:
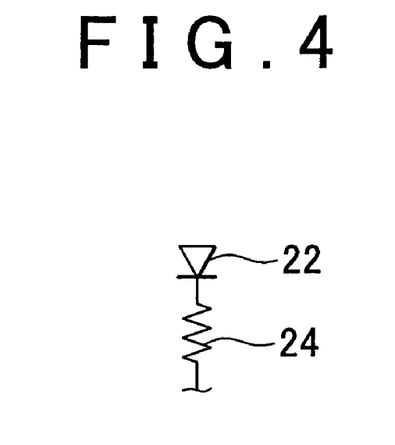
FIG. 4 is a view of one example of a temperature compensating circuit in which a compensating diode and a resistor are combined.
Figure 5:
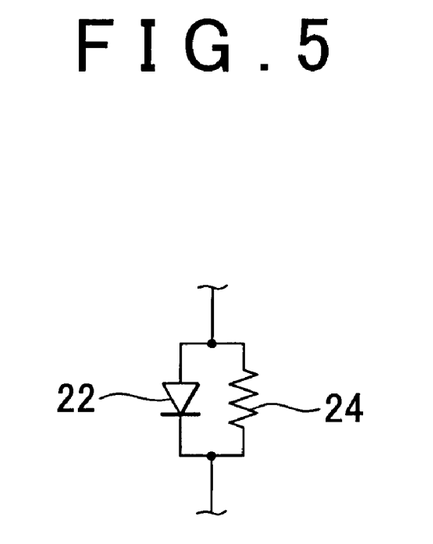
FIG. 5 is a view of another example of a temperature compensating circuit in which a compensating diode and a resistor are combined.
Figure 6:
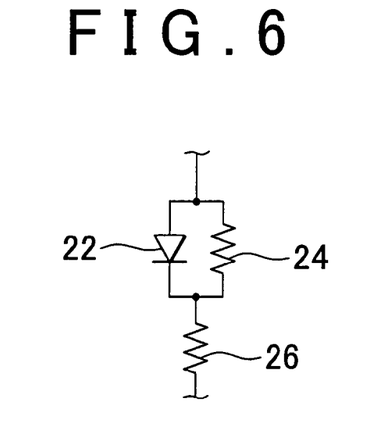
FIG. 6 is a view of yet another example of a temperature compensating circuit in which a compensating diode and resistors are combined.

The compensating diode 22 may be provided alone or a diode group in which a plurality of individual compensating diodes 22 are assembled together may be provided. When a diode group is used, the compensating diodes 22 may be connected in series or connected in parallel. Also, a resistor may also be added in addition to the compensating diode 22. For example, the compensating diode 22 and a resistor 24 may be connected in series as shown in FIG. 4, or the compensating diode 22 and the resistor 24 may be connected in parallel, as shown in FIG. 5. Also, the circuits shown in FIGS. 4 and 5 may be combined, as shown in FIG. 6. By using a plurality of compensating diodes 22 or a plurality of resistors 24 and 26, it is possible to make adjustments to compensate for the change in the piezoresistive element 30 that depends on the ambient temperature.

Figure 7:
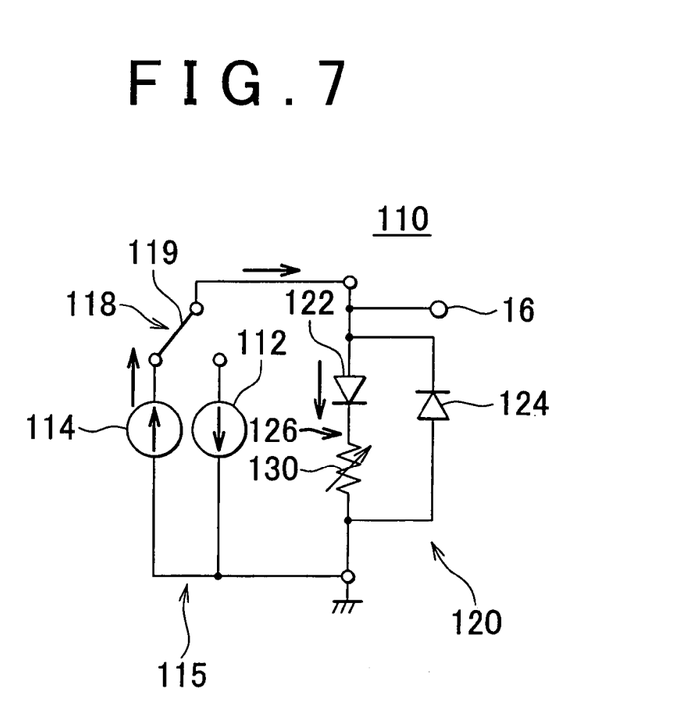
FIG. 7 is a circuit diagram when measuring stress, which shows a frame format of a stress measurement device according to a second example embodiment of the invention.
Figure 8:
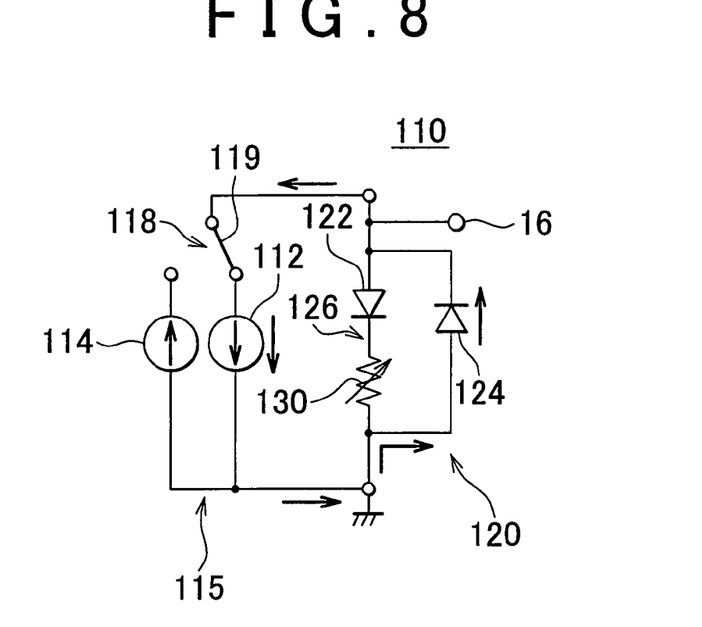
FIG. 8 is a circuit diagram when measuring temperature, which shows a frame format of the stress measurement device according to the second example embodiment.

FIGS. 7 and 8 are circuit diagrams that show frame formats of the structure of a stress measurement device 110 according to a second example embodiment of the invention. Parts of the description of this stress measurement device 110 that overlap with the description of the stress measurement device 10 according to the first example embodiment will be omitted. FIG. 7 shows the circuit configuration when measuring stress, and FIG. 8 shows the circuit configuration when measuring temperature. As shown in FIGS. 7 and 8, the stress measurement device 110 includes a sensor circuit 120, a current supply portion 115, and a voltage measuring portion 16. The sensor circuit 120 includes a stress measurement circuit 126 and a temperature measuring diode 124. The stress measurement circuit 126 has a series circuit of a compensating diode 122 and a piezoresistive element 130. The stress measurement circuit 126 and the temperature measuring diode 124 form a parallel circuit with respect to the current supply portion 115. The direction in which current flows through the compensating diode 122 is opposite the direction in which current flows through the temperature measuring diode 124. According to this structure, when current is flowing through the compensating diode 122, that is, stress measurement circuit 126, current does not flow through the temperature measuring diode 124. Also, when current is flowing through the temperature measuring diode 124, current does not flow through the compensating diode 122.

The current supply portion 115 includes two constant current supplies 112 and 114 and a switch 118. Current from the second constant-current power supply 112 is supplied to the sensor circuit 120 from one direction while current from the first constant-current power supply 114 is supplied to the sensor circuit 120 from the opposite direction. The first constant-current power supply 114 supplies current to the compensating diode 122. When the first constant-current power supply 114 is used as the power supply for supplying current to the sensor circuit 120, current flows through the stress measurement circuit 126. On the other hand, the second constant-current power supply 112 supplies current to the temperature measuring diode 124. The second constant-current power supply 112 and the first constant-current power supply 114 form a parallel circuit. The switch 118 is provided at a connection point of the second constant-current power supply 112 and the first constant-current power supply 114, and the sensor circuit 120. The direction in which current flows into the sensor circuit 120 is switched by either connecting a terminal 119 of the switch 118 to a contact point on the second constant-current power supply 112 side or connecting that terminal 119 of the switch 118 to a contact point on the first constant-current power supply 114 side.

As shown in FIG. 7, when the terminal 119 of the switch 118 is connected to the contact point on the first constant-current power supply 114 side, current from the first constant-current power supply 114 flows into the sensor circuit 120. The direction in which that current flows is shown by the arrows in FIG. 7. As described above, the current that flows from the first constant-current power supply 114 flows into the stress measurement circuit 126. The stress measurement circuit 126 includes the compensating diode 122 and the piezoresistive element 130. The current $I_s$ that is output from the first constant-current power supply 114 is set based on the temperature characteristics of the piezoresistive element 130 and the compensating diode 122. The current value of the current $I_s$ supplied from the first constant-current power supply 114 is set such that a value calculated by multiplying together the resistance of the piezoresistive element at normal temperature, a resistance temperature coefficient of the piezoresistive element, and that current, becomes equal to a rate of change in the voltage between the anode and cathode that depends on the temperature of the compensating diode 122. Thus, when the terminal 119 is connected to the contact point on the first constant-current power supply 114 side, the reference voltage related to the stress measurement stabilizes. Consequently, the stress measurement device 110 can accurately measure the hydraulic pressure while the terminal 119 is connected to the first constant-current power supply 114 side.

As shown in FIG. 8, when the terminal 119 of the switch 118 is connected to the contact on the second constant-current power supply 112 side, current flows from the second constant-current power supply 112 into the sensor current 120. The direction in which this current flows is shown by the arrows in FIG. 8. As described above, the current that flows from the second constant-current power supply 112 into the sensor circuit 120 passes through the temperature measuring diode 124. From the characteristics of the diode, when the ambient temperature increases, the voltage drops at the temperature measuring diode 124. The current that flows from the second constant-current power supply 112 into the sensor circuit 120 flows only through the temperature measuring diode 124. The output voltage from the voltage measuring portion 16 when measuring the temperature is the voltage of the temperature measuring diode 124. The stress measurement device 110 can easily measure the ambient temperature from the voltage of the temperature measuring diode 124. Incidentally, the value of the constant current that flows from the second constant-current power supply 112 into the sensor circuit 120 is not particularly limited as long as it is a value of the current that passes through the temperature measuring diode 124.

Figure 9:
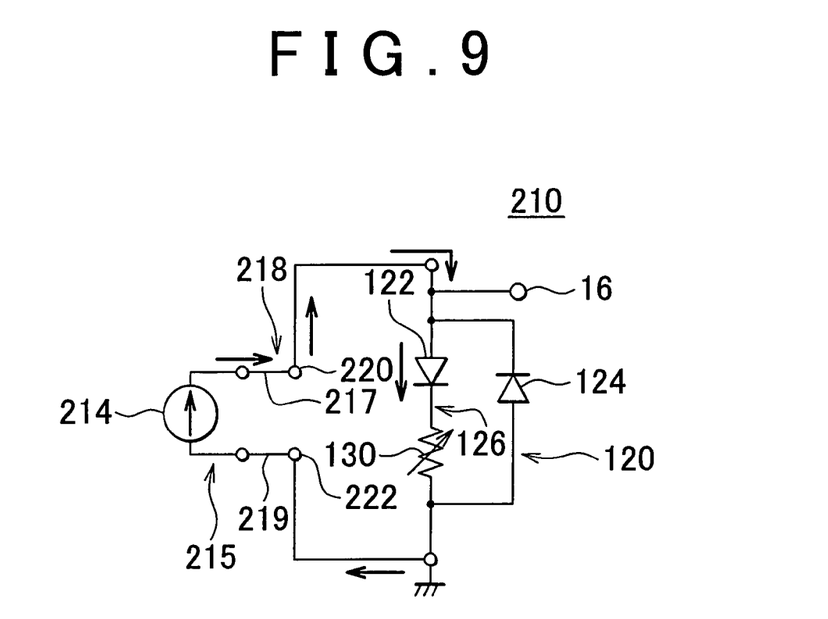
FIG. 9 is a circuit diagram when measuring stress, which shows a frame format of a stress measurement device according to a third example embodiment of the invention.
Figure 10:
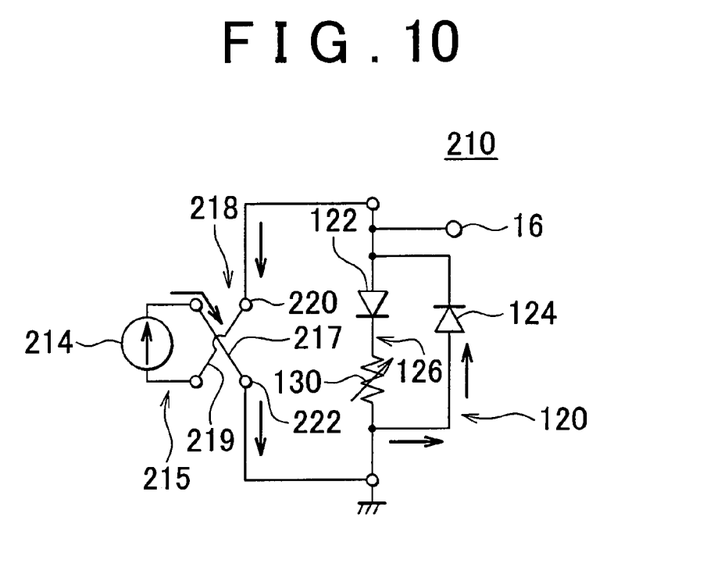
FIG. 10 is a circuit diagram when measuring temperature, which shows a frame format of the stress measurement device according to the third example embodiment.

FIGS. 9 and 10 are circuit diagrams showing frame formats of a structure of a stress measurement device 210 according to a third example embodiment of the invention. This stress measurement device 210 has the similar structure as the stress measurement device 110 of the second example embodiment with the exception of the structure of a current supply portion 215 which differs from the structure of the current supply portion 115 in the second example embodiment. Therefore, descriptions of the sensor circuit 120 and the like which are redundant will be omitted. FIG. 9 shows the circuit configuration when measuring stress in the stress measurement device 210. FIG. 10 shows the circuit configuration when measuring temperature in the stress measurement device 210. As shown in the drawings, the stress measurement device 210 includes the sensor circuit 120, the current supply portion 215, and the voltage measuring portion 16. The sensor circuit 120 has the similar structure as it does in the stress measurement device 110 of the second example embodiment.

The current supply portion 215 includes a constant-current power supply 214 and a switch 218. The switch 218 includes two terminals 217 and 219, and two contact points 220 and 222 that are connected to these two terminals 217 and 219. The terminal 217 is provided on an output side of the constant-current power supply 214, while the terminal 219 is provided on the opposite side. The contact point 220 is provided on the anode side of the compensating diode 122 and the cathode side of the temperature measuring diode 124. The contact point 222 is provided on the cathode side of the compensating diode 122 and the anode side of the temperature measuring diode 124.

When the terminal 217 is connected to the contact point 220 and the terminal 219 is connected to the contact point 222, as shown in FIG. 9, the current that flows from the constant-current power supply 214 into the sensor circuit 120 flows to the stress measurement circuit 126 side. The arrows in FIG. 9 show the direction in which the current flows. The stress measurement circuit 126 is a series circuit of the compensating diode 122 and the piezoresistive element 130. When the terminal 217 is connected to the contact point 220 and the terminal 219 is connected to the contact point 222, the reference voltage related to the stress measurement stabilizes, and thus the stress measurement device 210 can accurately measure the hydraulic pressure. The value of the current flowing from the constant-current power supply 214 into the sensor circuit 120 can be set according to the similar method used in the other example embodiments.

When the terminal 217 is connected to the contact point 222 and the terminal 219 is connected to the contact point 220, as shown in FIG. 10, the current flowing from the constant-current power supply 214 into the sensor circuit 120 flows to the temperature measuring diode 124 side. The arrows in FIG. 10 show the direction in which the current flows. When the ambient temperature increases, the output voltage drops at the temperature measuring diode 124. When the terminal 217 is connected to the contact point 222 and the terminal 219 is connected to the contact point 220, the current that flows from the constant-current power supply 214 into the sensor circuit 120 flows only through the temperature measuring diode 124. The output voltage from the voltage measuring portion 16 when measuring the temperature is the voltage of the temperature measuring diode 124. The stress measurement apparatus 210 can easily measure the ambient temperature from the voltage of the temperature measuring diode 124. The stress measurement device 210 can easily measure the ambient temperature by simply switching the connecting between the terminals 217 and 219 and the contact points 220 and 222 of the switch 218. Also, this structure is advantageous in that it only involves changing the structure of the switch and does not require a plurality of constant current power supplies.

Figure 11:
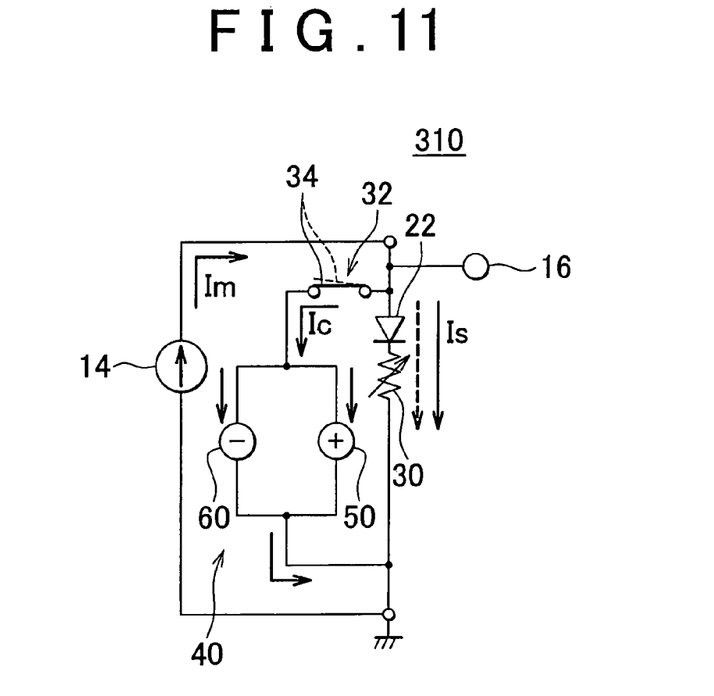
FIG. 11 is a circuit diagram showing a frame format of a stress measurement device according to a fourth example embodiment of the invention.

FIG. 11 is circuit diagram showing a frame format of a structure of a stress measurement device 310 according to a fourth example embodiment of the invention. This stress measurement device 310 has the similar structure as the stress measurement device 10 of the first example embodiment, except that a current regulating circuit 40 and a switch 32 that controls current flow to the current regulating circuit 40 are further provided. Therefore, redundant descriptions will be omitted. In this stress measurement device 310, the compensating diode 22 compensates for an increase in the reference voltage due to an increase in the ambient temperature.

The current regulating circuit 40 has a parallel circuit of a positive current regulating circuit 50 that increases the current value depending on an ambient temperature increase, and a negative current regulating circuit 60 that reduces the current value depending on an ambient temperature increase. The series circuit of the piezoresistive element 30 and the compensating diode 22 together with the current regulating circuit 40 form a parallel circuit. This parallel circuit is connected in series to the constant-current power supply 14. The voltage measuring portion 16 is connected to a connecting point between the constant-current power supply 14 and the compensating diode 22.

The voltage measuring portion 16 outputs a change in voltage that is derived from the change in resistance of the piezoresistive element 30 according to an increase in hydraulic pressure. Here, the change in voltage is output after being corrected by the current regulating circuit 40. When the increase in the hydraulic pressure is measured, the rate of change in the resistance value according to the change in the stress of the piezoresistive element 30 also changes from the effect of the ambient temperature. Unless the rate of change in the resistance value according to the change in the stress is maintained at a constant value, the amount of change in the voltage from the reference voltage will change from the effect of the ambient temperature. When the increase in the hydraulic pressure is measured, the current regulating circuit 40 adjusts the value of the current flowing into the piezoresistive element 30 in accordance with the change in the ambient temperature. If a value of the input current is different, a value of the output voltage from the piezoresistive element 30 also changes. If the current flowing into the piezoresistive element 30 is adjusted in accordance with the temperature when the stress is measured, that current value as well as the output voltage that is converted from the change in voltage of the piezoresistive element 30 is also adjusted.

Figure 12:
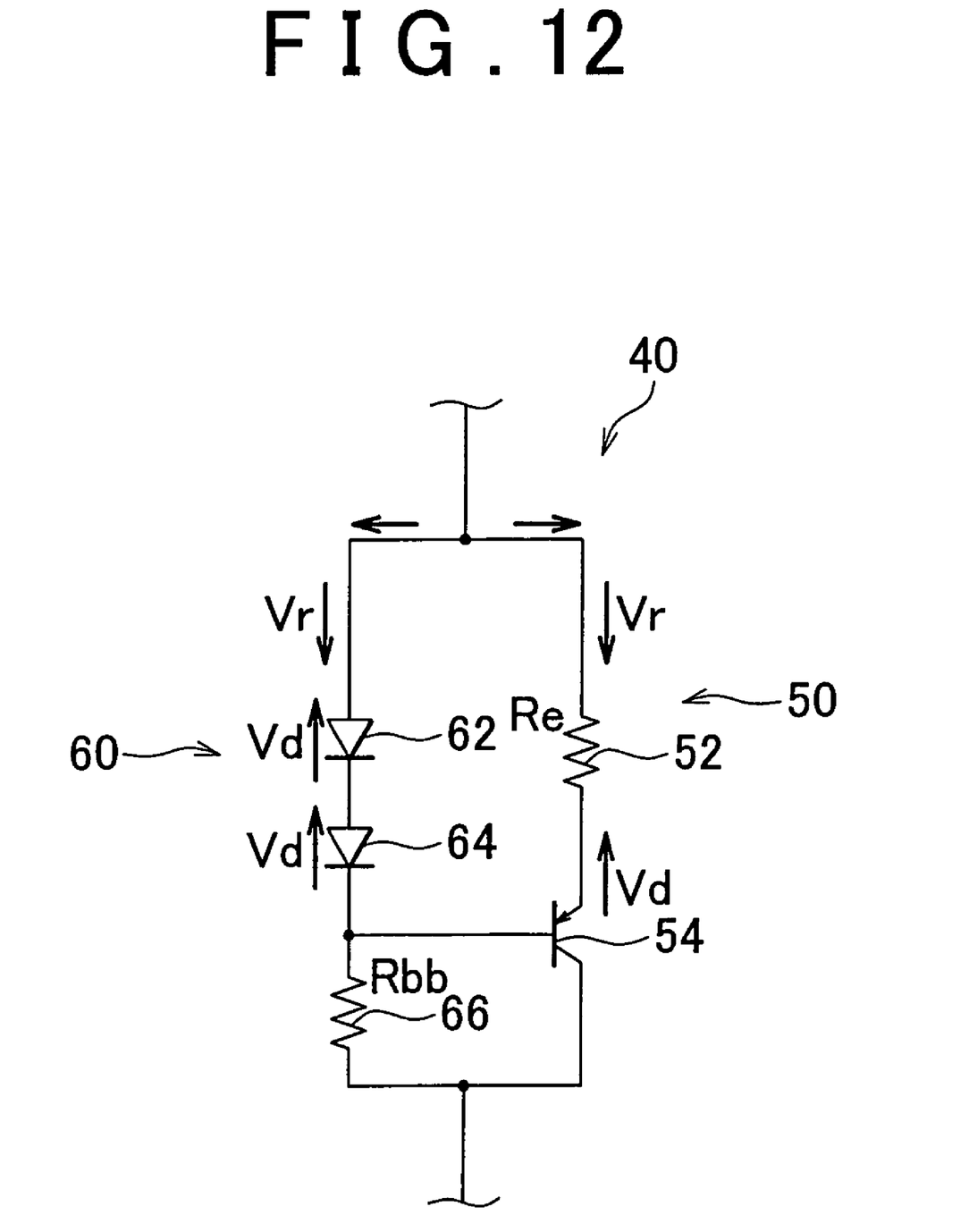
FIG. 12 is a circuit diagram showing an example of a current regulating circuit.

One example of the structure of the current regulating circuit 40 is the circuit shown in FIG. 12. In the positive current regulating circuit 50, a first fixed resistance 52 in which the resistance value is $R_e$ is connected in series to a pnp transistor 54. In the negative current regulating circuit 60, two diodes 62 and 64 are connected in series to a second fixed resistance 66 in which the resistance value is $R_{bb}$. A base terminal of the pnp transistor 54 in the positive current regulating circuit 50 is connected to a connecting point between the diode 64 and the second fixed resistance 66 in the negative current regulating circuit 60. A collector terminal of the pnp transistor 54 in the positive current regulating circuit 50 is connected to a terminal of the second fixed resistance 66 in the negative current regulating circuit 60, which the terminal of that second fixed resistance 66 is on the opposite side from the diode 64. A predetermined voltage $V_r$ is applied to the current regulating circuit 40.

When the current regulating circuit 40 shown in FIG. 12 is provided, a correction current $I_c$ flows through the circuit. This correction current $I_c$ corrects the value of the current $I_s$ that flows to the piezoresistive element 30 side. The correction current $I_c$ is the sum value of a current $I_{ca}$ that flows through the positive current regulating circuit 50 and a current $I_{cb}$ that flows through the negative current regulating circuit 60. First, the current $I_{cb}$ is derived. In the diodes 62 and 64 of the negative current regulating circuit 60, the voltage $V_d$ drops according to an increase in ambient temperature as described above. The relationship between the voltage $V_d$ and the ambient temperature change $\Delta T$ is shown in Expression 1. In Expression 1, $L_d$ is the temperature coefficient of the forward voltage of the diode. Typically, $L_d$ is $-0.002$V/°C. In Expression 1, T represents an arbitrary temperature, and $T_o$ represents the reference temperature. Also, $V_d$ (T) represents the voltage value of the diode at the arbitrary temperature T.

$$Vd(T)=Vd(To)+Ld\Delta T \qquad \text{[Expression 1]}$$

A voltage $V_r$ is also applied to the negative current regulating circuit 60. A voltage that is the difference of the voltage $V_r$ minus the amount of voltage drop of the diodes 62 and 64 is applied to the second fixed resistance 66. Therefore, the current $I_{cb}$ flowing through the negative current regulating circuit 60 can be derived as shown in Expression 2.

$$Icb = \frac{Vr - 2Vd(T)}{Rbb} \qquad \text{[Expression 2]}$$

Next, the current $I_{ca}$ flowing through the positive current regulating circuit 50 is derived. The current $V_r$ is applied to the positive current regulating circuit 50. A parasitic pn diode is formed between an emitter and a base of the pnp transistor 54 in the positive current regulating circuit 50. The voltage $V_d$ drops according to an increase in temperature, similar to the diodes 62 and 64, between the emitter and the base of the pnp transistor 54 (see Expression 1). As described above, the base terminal of the pnp transistor 54 is connected to the negative current regulating circuit 60. Voltage in the opposite direction as compared to negative current regulating circuit 60 side is applied to the first fixed resistance 52 in the positive current regulating circuit 50. Voltage shown in Expression 3 is applied to the first fixed resistance 52. Therefore, the current $I_{ca}$ flowing into the positive current regulating circuit 50 can be derived as shown in Expression 4 from the resistance $R_e$ of the first fixed resistance 52 and the voltage $V_{ca}$.

$$Vca = (Vr - Vd(T)) - (Vr - 2Vd(T)) = Vd(T) \qquad \text{[Expression 3]}$$

$$Ica(T) = \frac{Vd(T)}{Re} \qquad \text{[Expression 4]}$$

The current $I_c$ flowing through the current regulating circuit 40 is the sum value of the current $I_{ca}$ and the current $I_{cb}$. The sensor circuit 15 and the current regulating circuit 40 are parallel circuits so the current $I_s$ that flows through the piezoresistive element 30 in the sensor circuit 15 can be derived from Expression 5.

$$Is(T) = Iin - (Ica(T) + Icb(T)) \qquad \text{[Expression 5]}$$

The current $I_{ca}$ of the positive current regulating circuit 50 and the current $I_{cb}$ of the negative current regulating circuit 60 can be changed by adjusting the resistance value $R_e$ of the first fixed resistance 52 and/or the resistance value $R_{bb}$ of the second fixed resistance 66. Also, the current $I_s$ that flows into the piezoresistive element 30 can be adjusted by the correction current $I_c$. Accordingly, the change in voltage according to an increase in hydraulic pressure can be accurately corrected. As a result, the stress measurement device 310 can accurately measure the hydraulic pressure.

The stress measurement device 310 is provided with the current regulating circuit 40 as shown in FIG. 12, for example, so the value of the current $I_s$ that flows into the piezoresistive element 30 when the stress is measured, changes according to the temperature. A current $I_{in}$ of the constant-current power supply 14 is set so that there is no change in the reference voltage $V_{st}$ when the stress is measured. At the temperature T, the current $I_s$ (T) that flows into the piezoresistive element 30 is the current obtained by subtracting the current $I_c$ (T) of the current regulating circuit 40 from the current $I_{in}$ of the constant-current power supply 14.

$$Is(T) = Iin - Ic(T) \qquad \text{[Expression 6]}$$

In order to make the reference voltage $V_{st}$ when measuring the stress constant, the voltage of the piezoresistive element 30 shown in Expression 7 and the voltage of the diode (i.e., the compensating diode 22) shown in Expression 8 may be set to cancel each other out regardless of the temperature. $L_s$ shown in Expression 7 represents a temperature coefficient of the voltage generated in the piezoresistive element 30. The reference voltage $V_{st}$ is the sum value of the voltage of the piezoresistive element 30 and the voltage of the compensating diode 22 and so is shown in Expression 9. Therefore, in order to make the reference voltage $V_{st}$ constant, the temperature coefficient $L_s$ and the temperature coefficient $L_d$ of the compensating diode 22 may be adjusted such that their sum is 0, as shown in Expression 10. Here, the adjustment with the temperature coefficient $L_s$ may be done by changing the number of compensating diodes 22. When N number of compensating diodes 22 are connected in series, a temperature coefficient $L_{dg}$ of the compensating diode 22 group is as shown in Expression 11.

$$Vs(T) = Vs(To) + Ls\Delta T \qquad \text{[Expression 7]}$$

$$Vd(T) = Vd(To) + Ld\Delta T \qquad \text{[Expression 8]}$$

$$\begin{aligned} Vst &= Vd(T) + Vs(T) \\ &= Vd(T) + Vs(T) + (Ld + Ls)\Delta T \end{aligned} \qquad \text{[Expression 9]}$$

$$Ld + Ls = 0 \qquad \text{[Expression 10]}$$

$$Ldg = N \times Ld \qquad \text{[Expression 11]}$$

On the other hand, the voltage $V_s$ (T) of the piezoresistive element 30 is the product of the resistance $R_s$ (T) multiplied by the current $I_s$ (T). Also, as shown in Expression 12, the resistance $R_s$ (T) in the piezoresistive element 30 changes depending on the temperature by a coefficient of $K_s$ (%/° C.). The current $I_s$ that flows through the piezoresistive element 30 changes depending on the temperature by a coefficient of $K_{is}$ (%/° C.), as shown in Expression 13. The voltage $V_s$ output from the piezoresistive element 30 can also be derived from Expression 14.

$$Rs(T) = Rs(To)(1 + Ks\Delta T) \qquad \text{[Expression 12]}$$

$$Is(T) = Is(To)(1 + Kis\Delta T) \qquad \text{[Expression 13]}$$

$$\begin{aligned} Vs(T) &= Rs(T) \times Is(T) \\ &= Rs(To)(1 + Ks\Delta T) \times Is(To)(1 + Kis\Delta T) \\ &= Rs(To) \times Is(To) \times \\ & \quad (1 + Ks \times \Delta T)(1 + Kis\Delta T) \\ &= Rs(To) \times Is(To) \times \\ & \quad (1 + Ks\Delta T + Kis\Delta T + Ks \cdot Kis\Delta T^2) \\ &= Vs(To) \times \{1 + (Ks + Kis)\Delta T + Ks \cdot Kis\Delta T^2\} \end{aligned} \qquad \text{[Expression 14]}$$

Because the absolute value of $K_s$ and $K_{is}$ is less than 1, $K_s + K_{is} \gg K_s \cdot K_{is}$. In Expression 14, $K_s \cdot K_{is}$ may be ignored. $V_s$ (T) can be approximated as shown in Expression 15.

$$\begin{aligned} Vs(T) &= Vs(To) \times \{1 + (Ks + Kis)\Delta T\} \\ &= Vs(To) + (Ks + Kis)Vs(To)\Delta T \end{aligned} \qquad \text{[Expression 15]}$$

The following conditional expression (Expression 16) can be derived from Expressions 7, 10, and 15.

$$Vs(To) = \frac{-Ld}{Ks + Kis}$$ [Expression 16]

In Expression 16, when the temperature coefficient $K_s$ of the resistance value of the piezoresistive element 30 is 0.15%/° C., the temperature coefficient $K_{is}$ of the current that flows through the piezoresistive element 30 is −0.1%/° C., and the temperature coefficient $L_d$ of the voltage of the compensating diode is −0.002V/° C., the voltage $V_s(T_o)$ of the piezoresistive element 30 at the reference temperature $T_o$ can be derived as shown in Expression 16.

$$Vs(To) = \frac{0.002}{0.0015 + (-0.001)} = 4(V)$$ [Expression 17]

In the case of the condition of Expression 17 above, the current $I_{in}$ of the constant-current power supply 14 may be adjusted so that the output voltage of the piezoresistive element 30 at the reference temperature $T_o$ is 4V. Determining the output current $I_{in}$ of the constant-current power supply 14 by this manner enables the reference voltage $V_{st}$ to be kept constant when the stress is measured.

When the temperature is measured with the stress measurement device 310, the switch 32 is turned off. When the switch 32 is turned off, current stops flowing through the current regulating circuit 40 and flows in the direction shown by the broken arrow in FIG. 11. A current (such as $I_{in}/2$) that is suitable for measuring the temperature is applied. Incidentally, the stress measurement device 310 measures the ambient temperature after current has stopped flowing through the current regulating circuit 40. Therefore, the circuit configuration for the temperature measurement in the stress measurement device 310 is similar to that in the stress measurement device 10 of the first example embodiment, so a description of the temperature measurement will be omitted.

Figure 13:
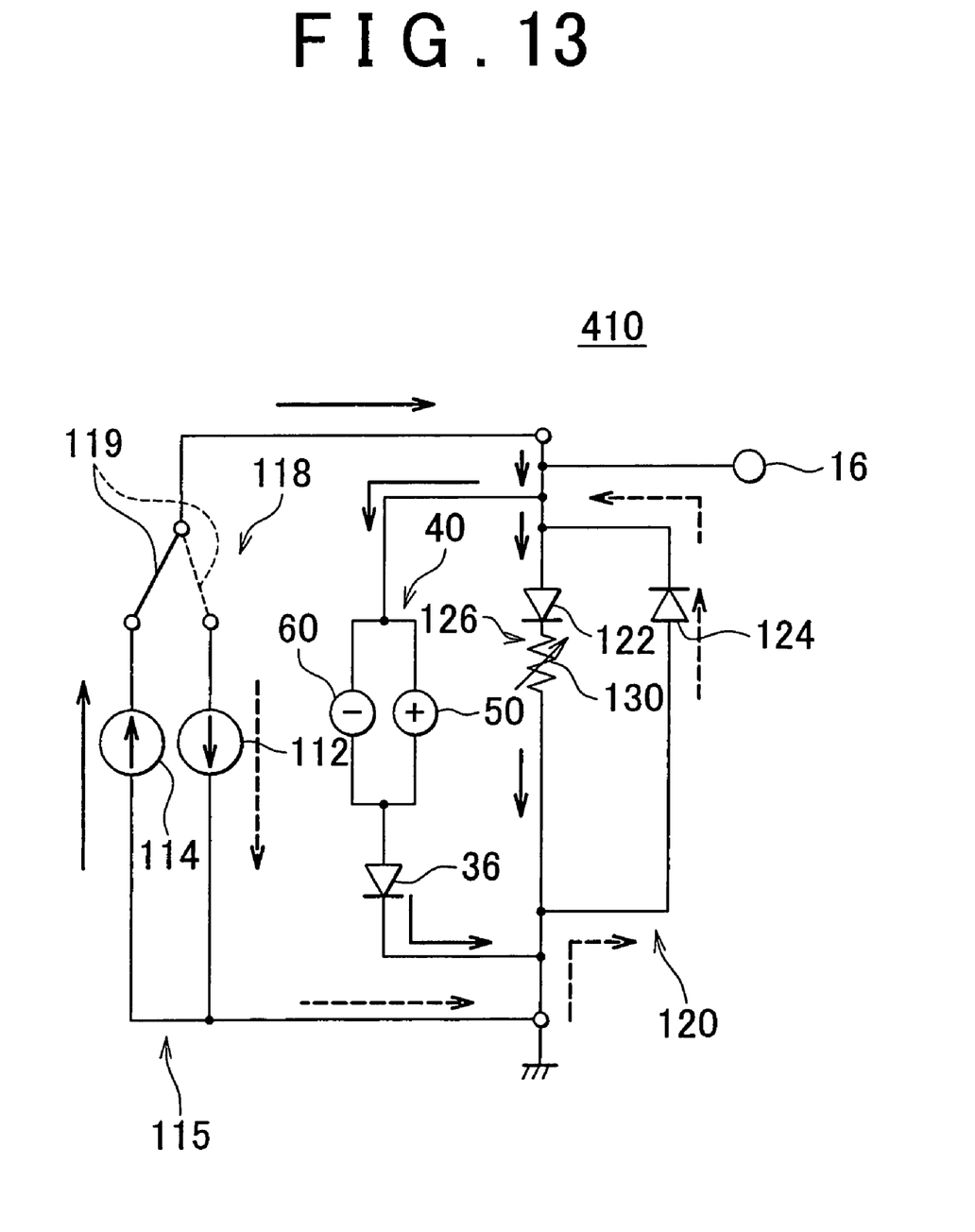
FIG. 13 is a circuit diagram showing a frame format of a stress measurement device according to a fifth example embodiment of the invention.

FIG. 13 is a circuit diagram showing a frame format of the structure of a stress measurement device 410 according to a fifth example embodiment of the invention. The stress measurement device 410 has the similar structure as the stress measurement device 110 of the second example embodiment except that a current regulating circuit 40 and a diode 36 that controls the flow of current to the current regulating circuit 40 are provided. Therefore, redundant descriptions will be omitted. The diode 36 is one example of an interrupting portion.

When measuring stress, the terminal 119 of the switch 118 is connected to the first constant-current power supply 114 side. The current input by the current supply portion 115 to the sensor circuit 120 is the current output from the first constant-current power supply 114. The solid arrows shown in FIG. 13 represents the direction in which the current flows when measuring stress. In the stress measurement device 410, the increase in the reference voltage according to the ambient temperature is corrected by the compensating diode 122.

The stress measurement device 410 is provided with the current regulating circuit 40, similarly to the stress measurement device 310 of the fourth example embodiment. In the stress measurement device 410, the current regulating circuit 40 corrects the amount of change that depends on the ambient temperature in the rate of the change in the output voltage that indicates a change in the hydraulic pressure. When measuring stress in the stress measurement device 410, the reference voltage is stable. Also in the stress measurement device 410, the rate of change in the output voltage with respect to a change in the hydraulic pressure is stable. Therefore, the stress measurement device 410 can accurately measure a change in the hydraulic pressure regardless of the ambient temperature.

When measuring the temperature with the stress measurement device 410, the terminal 119 of the switch 118 is connected to the second constant-current power supply 112 side. The current that flows from the current supply portion 115 into the sensor circuit 120 flows in the direction indicated by the broken arrows in FIG. 13. The diode 36 is connected in series to the current regulating circuit 40. Due to the diode 36, the current do not flow from the second constant-current power supply 112 into the sensor circuit 120. Current is stopped from flowing into the current regulating circuit 40 when the power supply that flows current from the current supply portion 115 into the sensor circuit 120 switches to the second constant supply 112. When the temperature is measured, current flows only through the temperature measuring diode 124. As a result, the ambient temperature can be easily measured from the output voltage of the temperature measuring diode 124.

Figure 14:
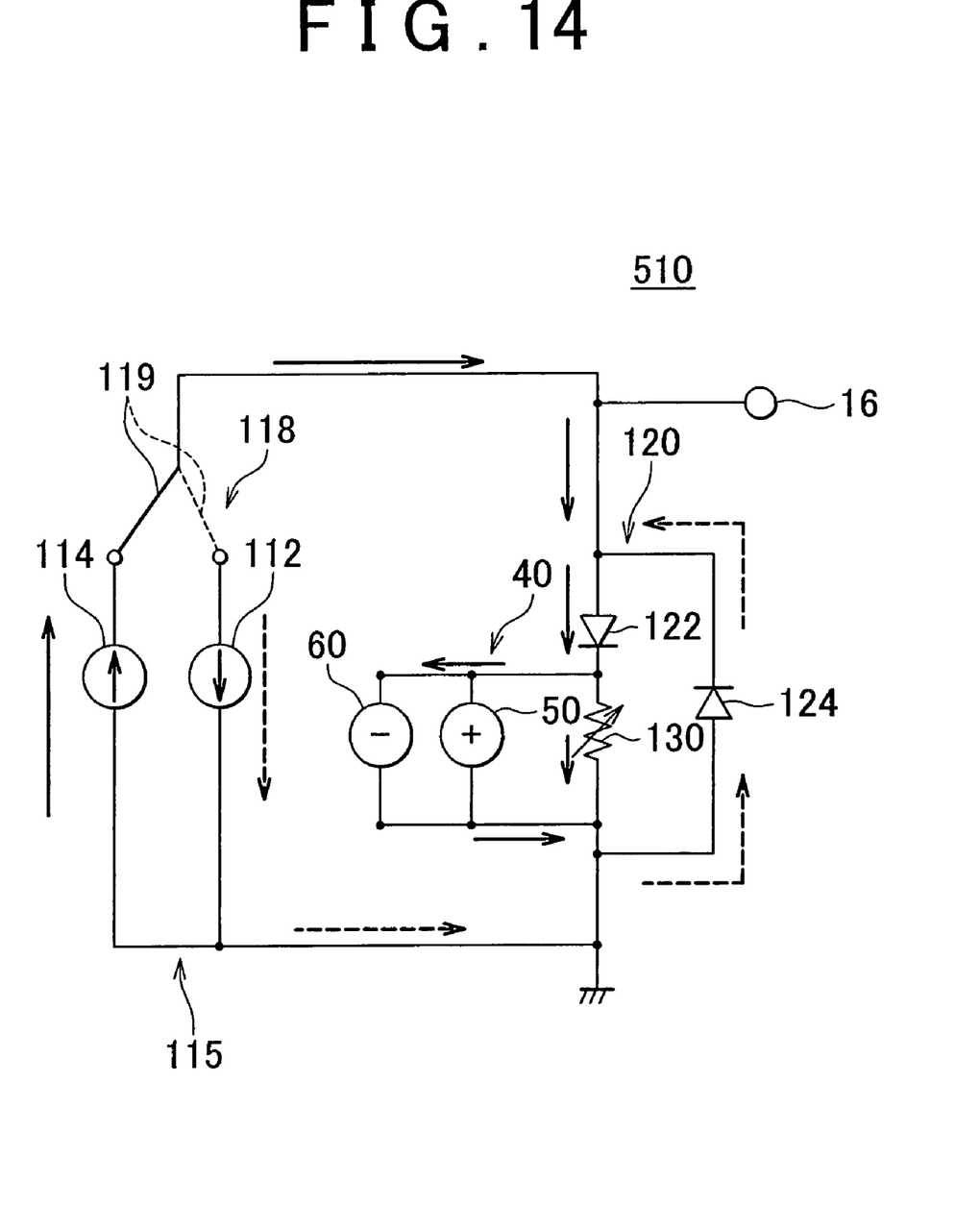
FIG. 14 is a circuit diagram showing a frame format of a stress measurement device according to a sixth example embodiment of the invention.

FIG. 14 is a circuit diagram showing a frame format of the structure of a stress measurement device 510 according to a sixth example embodiment of the invention. The stress measurement device 510 is similar to the stress measurement device 410 of the fifth example embodiment with the exceptions that the current regulating circuit 40 is connected to a connecting point of the piezoresistive element 130 and the compensating diode 122 of the sensor circuit 120, and the diode 36 is not provided. Therefore, redundant descriptions will be omitted.

When measuring stress, the terminal 119 of the switch 118 is connected to the first constant-current power supply 114 side. Current that flows from the current supply portion 115 into the sensor circuit 120 is current that was output by the first constant-current power supply 114. The solid arrow shown in FIG. 14 represents the direction in which the current flows when measuring stress. In the stress measurement device 510, an increase in the reference voltage according to the ambient temperature is corrected by the compensating diode 122. The stress measurement device 510 is provided with a current regulating circuit 40. In the stress measurement device 510, the current regulating circuit 40 corrects the amount of change that depends on the ambient temperature in the rate of the change in the output voltage that indicates a change in the hydraulic pressure. The rate of change in the reference pressure and the output voltage with respect to an increase in stress is stabilized when stress is measured in the stress measurement device 510. As a result, the stress measurement device 510 can accurately measure a change in the hydraulic pressure regardless of the ambient temperature.

When measuring the temperature with the stress measurement device 510, the terminal 119 of the switch 118 is connected to the second constant-current power supply 112 side. The broken arrows in FIG. 14 represents the direction in which the current flows from the current supply portion 115 into the sensor circuit 120. The current regulating circuit 40 is connected to a connecting point between the piezoresistive element 130 and the compensating diode 122. The compensating diode 122 only allows current that has been output from the first constant-current power supply 114 to flow through. Accordingly, when the power supply that inputs current into the sensor circuit 120 switches to the second constant supply 112, current stops flowing through the current regulating circuit 40. When the temperature is being measured, current only flows through the temperature measuring diode 124. As a result, the ambient temperature can be easily measured from the output current of the temperature measuring diode 124.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A stress measurement device comprising:
  a current supply portion;
  a series circuit which is connected to the current supply portion and has a piezoresistive element that forms a single gauge resistance and a compensating diode that is connected in series to the piezoresistive element;
  a voltage measuring portion that measures voltage between both ends of the series circuit;
  a current regulating circuit that has a parallel circuit of a negative current regulating circuit which reduces a current value depending on the increase in temperature, and a positive current regulating circuit which increases the current value depending on the increase in temperature,
  wherein the single gauge resistance has i) a piezoresistive effect in which a resistance value changes according to applied stress, and ii) a positive temperature characteristic in which the resistance value increases depending on an increase in temperature,
  wherein the compensating diode is provided in a forward direction with respect to the current supply portion and has a negative temperature characteristic in which a voltage between an anode and a cathode of the compensating diode decreases depending on the increase in temperature, and
  wherein the piezoresistive element and the current regulating circuit are connected in parallel with the current supply portion.

2. The stress measurement device according to claim 1, further comprising:
  an interrupting portion that allows a current to flow through the current regulating circuit and prohibits a separate current from flowing through the current regulating circuit.

3. The stress measurement device according to claim 2, wherein the interrupting portion is a diode.

4. A stress measurement method comprising:
  supplying current to a series circuit that has i) a piezoresistive element that forms a single gauge resistance having a piezoresistive effect in which a resistance value changes according to applied stress, and a positive temperature characteristic in which the resistance value increases depending on an increase in temperature, and ii) a compensating diode that is connected in series to the piezoresistive element, is provided in a forward direction with respect to a current supply portion, and has a negative temperature characteristic in which a voltage between an anode and a cathode of the compensating diode decreases depending on the increase in temperature;
  measuring voltage between both ends of the series circuit;
  converting a value of the measured voltage into a stress value;
  reducing a current value depending on the increase in temperature with a current regulating circuit that has a parallel circuit of a negative current regulating circuit, and increasing the current value depending on the increase in temperature with a positive current regulating circuit,
  wherein the piezoresistive element and the current regulating circuit are connected in parallel with the current supply portion.

5. The stress measurement method according to claim 4, further comprising:
  allowing a current to flow through the current regulating circuit an interrupting portion, and
  prohibiting a separate current from flowing through the current regulating circuit.

6. The stress measurement method according to claim 5, wherein the interrupting portion is a diode.

* * * * *